3,824,229
3-OXO-1,2,4-TRIAZINE NUCLEOSIDES
Gabor L. Szekeres and Roland K. Robins, Santa Ana, and Robert A. Long, Costa Mesa, Calif., assignors to International Chemical and Nuclear Corporation, Pasadena, Calif.
No Drawing. Filed July 20, 1972, Ser. No. 273,464
Int. Cl. C07d 51/52, 55/10
U.S. Cl. 260—211.5 R                    9 Claims

ABSTRACT OF THE DISCLOSURE

3-Oxo-1,2,4-triazine nucleosides are disclosed which have demonstrated antitumor, antimicrobial and antiviral activity. 3-Oxo-1,2,4-triazine $N_1$-oxide is also disclosed which is an intermediate in the synthetic process. Antitumor efficacy has been demonstrated with respect to KB, Hep–2, Hela, and RK–13 cells.

BACKGROUND OF THE INVENTION 1,2-dihydro-2-oxopyrazine 4-oxide (Emimycin), a structural analog of uracil, has been isolated from a strain of *Streptomyces* and found to be effective for inhibition of bacterial growth, M. Terao et al., *J. Antibiot.*, Ser. A., 13, 401 (November 1960); M. Terao, *J. Antibiot.*, Ser. A. 16, 182–186 (September 1963). It has also been reported that the inhibitory effects of this compound, as well as its ribonucleoside, were reversed competitively by uracil, cytosine and their nucleosides, Zeeuw and Tynam, *J. Antibiot.*, 22 386 (August 1969); Bobek and Bloch, *J. Med. Chem.*, 15, 164 (1972). This evidence suggests that Emimycin and its ribonucleoside may function as uracil antagonists.

In view of the foregoing information, we determined to synthesize other structural analogs of uracil and uridine possessing the *N*-oxide function and to investigate their biological properties.

SUMMARY OF THE INVENTION

Compounds of the structure

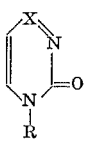

are disclosed, which are useful as antitumor (KB, Hep–2, Hela and RK–13 cells), antimicrobial and, in one instance antiviral agents. X may be N or *N*-oxide, while R may be H, $\beta$-D-ribofuranosyl or 2-deoxy-D-ribofuranosyl. When X is N, R is $\beta$-D-ribofuranosyl.

DETAILED DESCRIPTION OF THE INVENTION

The triazine nucleosides of the present invention are prepared by the following synthetic route. 3-Methoxy-1,2,4-triazine, which may be prepared according to the procedure of W. W. Paudler and T. K. Chen, *J. Heterocycl. Chem.*, 7, 769 (1970), may be reacted with *m*-chloroperbenzoic acid under refluxing conditions to provide 3-methoxy-1,2,4-triazine *N*-oxide, which upon treatment with a blocked ribofuranosyl bromide in acetonitrile, yield two crystalline products which deposit from the reaction mixture after standing at room temperature for several days, namely, the blocked 3-oxo-1,2,4-triazine $N_1$-oxide nucleoside and 3-oxo-1,2,4-triazine $N_1$-oxide. Upon treatment of the blocked nucleoside with sodium methoxide in anhydrous methanol, $N_4$-($\beta$-D-ribofuranosyl)-3-oxo-1,2,4-triazine $N_1$-oxide (X is N-oxide and R is $\beta$-D-ribofuranosyl in the foregoing structure) is obtained.

Treatment of 3-oxo-1,2,4-triazine $N_1$-oxide with hexamethyldisilazine affords 3-trimethylsilyloxy-1,2,4-triazine $N_1$-oxide, which may be reacted with 3,5-di-O-*p*-chlorobenzoyl-2-deoxy-D-ribofuranosyl chloride to give an anomeric mixture of $N_4$-(3,5-di-O-*p*-chlorobenzoyl-2-deoxy-D-ribofuranosyl)-3-oxo-1,2,4-triazine $N_1$-oxide. Reaction of the $\beta$ isomer in methanol with sodium methoxide gives $N_4$-($\beta$-2-deoxy-D-ribofuranosyl) - 3 - oxo-1,2,4-triazine $N_1$-oxide.

Deblocking of the blocked 3-oxo-1,2,4-triazine $N_1$-oxide nucleoside with methanolic ammonia resulted in the isolation of $N_4$-($\beta$-D-ribofuranosyl)-3-oxo-1,2,4-triazine. A comparison of the ultra violet spectra of this compound and 2-methyl-3-oxo-1,2,4-triazine prepared according to the procedure of Paudler and Lee, *J. Org. Chem.*, 36, 3921 (1971), showed a very marked difference which confirmed the structure of the blocked 3-oxo-1,2,4-triazine $N_1$-oxide nucleoside with regard to the site of glycolsylation on the heterocycle.

3-Oxo-1,2,4-triazine $N_1$-oxide may also be prepared by acid hydrolysis of 3-methoxy-1,2,4-triazine $N_1$-oxide utilizing dilute methanolic HCl in a $CH_2CN$ solution.

The invention will be better understood by reference to the following specific but illustrative examples. NMR spectra were recorded on Hitachi Perkin Elmer R–20A spectrometer in $CDCl_3$ (TMS), deut DMSO (DSS) or $D_2O$ (DSS) with the appropriate internal standards. UV spectra were determined on Cary 15 Ultraviolet Spectrophotometer, mass spectra were recorded on Perkin Elmer 270 Mass Spectrometer. Optical rotations were measured on Perkin Elmer 141 Polarimeter. Melting points were determined on a Thomas Hoover Unimelt capillary melting point apparatus, and are uncorrected. Evaporations were performed under reduced pressure on a rotary evaporator. Thin layer chromatography was performed on Analtech precoated (250 microns) silica gel GF plates, and the spots were visualized by irradiation with a Mineralight UV lamp. Column chromatography was carried out utilizing the method of Loev and Goodman, *Chemistry and Industry*, 1967, 2026 in plastic tubes transparent to UV light. The tubes were packed with silica gel powder containing 1% zinc silicate fluorescent indicator. The compounds were applied to the column preabsorbed on silica gel, accomplished by adding silica gel to a solution of the compounds followed by evaporation to dryness. The columns were then eluted with the appropriate solvent. The position of the bands on the column was visualized by irradiation with a Mineralight UV lamp. These columns are referred to as "dry columns." Elemental analyses were performed by Heterocyclic Chemical Corp., Harrisonville, Mo. 64701.

EXAMPLE I

3-Methoxy-1,2,4-Triazine $N_1$-Oxide

To a solution of 3-methoxy-1,2,4-triazine (7.5 g., 0.0675 mol) in $C_6H_6$ (520 ml.) was added *m*-chloroperbenzoic acid (purchased from K and K Laboratories Inc., 37.0 g., 0.182 mol active ingredient), and the resulting mixture was refluxed for 24 hr. $C_6H_6$ was then evaporated, the residue dissolved in $CHCl_3$, and the $CHCl_3$ solution was extracted 3 times with saturated $Na_2CO_3$ solution. After drying ($Na_2SO_4$) the mixture was applied to a dry column of silica gel and eluted with $CHCl_3$, EtOAc (9:1). The main UV absorbing component was vacuum sublimed (65°, 0.2 Hg mm.) to give the compound (2.576 g., 30.0%). Resublimation raised the m.p. to 70–72°, identical with the m.p. reported by Paudler and Chen, *J. Org. Chem.*, 36, 787 (1971).

EXAMPLE II $N_4$-(2,3,5-Tri-O-Benzoyl-$\beta$-D-Ribofuranosyl)-3-Oxo-1,2,4-Triazine $N_1$-Oxide and 3-Oxo-1,2,4-Triazine $N_1$-Oxide To a solution of halogenose (freshly prepared from 10.08 g., 20 mmol of 2,3,5-tri-O-benzoyl-1-O-acetyl-D-ribofuranose) in $CH_3CN$ (100 ml.) was added the product of Example I (2.04 g., 16 mmol). The resulting clear solution was allowed to stand without stirring. After 1 week, the mixture of crystals deposited from this solution was filtered off, and the filter cake was treated with hot $CHCl_3$ (1 l.). The $CHCl_3$ insoluble crystals of 3-Oxo-1,2,4-triazine $N_1$-oxide were removed by filtration, and were recrystallized from $H_2O$ to give 0.195 g. (10.8%), m.p. 228–230° decomp. Recrystallization from $H_2O$ furnished a sample for analysis, m.p. 234° decomp.

UV spectrum: $\lambda_{max.}^{H_2O}$ 256, 337 ($\epsilon$ 6780, 5880); $\lambda_{max.}^{pH\ 11}$ 252, 335 ($\epsilon$ 7240, 6350).

NMR (deut. DMSO): 8.22 p.p.m. (d J=5 Hz.), 7.70 p.p.m. (d J=5 Hz.).

Anal.—Calcd. for $C_3H_3N_3O_2$: C, 31.87; H, 2.67; N, 37.16. Found: C, 31.75; H, 2.67; N, 36.92.

The hot $CHCl_3$ solution obtained above was concentrated, EtOH was added and after standing at 25° for 12 hrs., white fluffy crystals of the blocked nucleoside were collected, and recrystallized from $CHCl_3$-EtOH to give pure product (3.40 g., 43.5%), m.p. 236–8°; $[\alpha]_D^{22}$ +31° (C. 1.0, $CHCl_3$). The yield of 3-Oxo-1,2,4-triazine $N_1$-oxide varied in different batches between 0 to 30%, but the yield of blocked nucleosides based on 3-methoxy-1,2,4-triazine $N_1$-oxide not converted to 3-Oxo-1,2,4-triazine $N_1$-oxide, was consistently 40–45%.

Anal.—Calcd. for $C_{29}H_{23}N_3O_9$: C, 62.47; H, 4.15; N, 7.53. Found: C, 62.49; H, 4.25; N, 7.34.

EXAMPLE III $N_4$-($\beta$-D-Ribofuranosyl)-3-Oxo-1,2,4-Triazine $N_1$-Oxide

To a suspension of the blocked nucleosides of Example II (1.70 g., 3.05 mmol) in anhydrous MeOH (60 ml.) was added a solution of $NaOCH_3$ (0.486 g., 9.0 mmol) in anhydrous MeOH (50 ml.) and the mixture was stirred for 5 hr. Dowex 50 WX8 ion exchange resin (H+ form, 18 ml. wet vol. in MeOH) was added to the clear solution and stirring was continued for 10 min. The ion exchange resin was removed by filtration, the MeOH solution concentrated to a few ml. and $Et_2O$ (150 ml.) was added. After standing overnight, the crystalline product was collected by filtration and washed with large amounts of $Et_2O$ (0.576 g., 77%), m.p. 172–3° decomp. Two recrystallizations from MeOH furnished a sample for analysis, m.p. 174–76° decomp.

UV spectrum: $\lambda_{max.}^{H_2O\ and\ pH\ 1}$ 207, 267, 343 ($\epsilon$ 16750, 8510 7640); $\lambda_{max.}^{pH\ 11}$ 232, 273 ($\epsilon$ 9380, 6640).

NMR (deut. DMSO): 8.78 p.p.m. (d J=5.5 Hz.), 7.80 p.p.m. (d J=5.5 Hz.), 5.78 p.p.m. (singlet), 4.10 p.p.m. (multiplet); $[\alpha]_D^{22}$ +229° (C. 1.0, $H_2O$).

Anal.—Calcd. for $C_8H_{11}N_3O_6$: C, 39.18; H, 4.52; N, 17.13. Found: C, 39.33; H, 4.50; N, 17.20.

EXAMPLE IV $N_4$-($\beta$-D-Ribofuranosyl)-3-Oxo-1,2,4-Triazine

Blocked nucleoside of Example II (0.900 g., 1.62 mmol) was treated with 120 ml. of ethanolic ammonia (saturated at 0°) in a pressure bottle at 25° for 5 days. After evaporation of the solvent, the brown residue was dissolved in $H_2O$ (100 ml.) and was extracted 3 times with $CHCl_3$ (80 ml. each). The aqueous phase was evaporated to dryness, the residue dissolved in $H_2O$ (25 ml.) and filtered from insoluble material. The solution was evaporated to dryness again and the brown residue was crystallized from EtOH to give the product (0.160 g., 43.2%). Two recrystallizations furnished a sample (yellow powder) for analysis. This compound appeared to be unstable on prolonged standing, and the signals in the nmr spectrum were unusually broadened, indicating possible decomposition in the solvent, deut. DMSO.

UV spectrum: $\lambda_{max.}^{EtOH}$ 225–6, 255, 346 ($\epsilon$=6981, 4936, 2400); $\lambda_{max.}^{pH\ 1}$ 226–7, 255, 346 ($\epsilon$=6487, 4795, 2120); $\lambda_{max.}^{pH\ 11}$ 234, 347 ($\epsilon$=6008, 2891).

Anal.—Calcd. for $C_8H_{11}N_3O_5$: C, 41.92, H, 4.83, N, 18.33. Found: C, 41.97, H, 4.86, N, 18.41.

EXAMPLE V

3-Oxo-1,2,4-Triazine-$N_1$-Oxide by Acid Hydrolysis

To a solution of 3-methoxy-1,2,4-triazine-$N_1$-oxide (0.100 g., 0.788 mmol) in $CH_3CN$ (5 ml.), was added dilute methanolic HCl (0.5N, 0.125 ml.), and the solution was allowed to stand for several days. The crystalline material deposited from this solution was recrystallized from $H_2O$ to give the product (0.004 g., 4.5%); melting point and UV were identical with the analytically pure product of Example II.

EXAMPLE VI

3-Trimethylsilyloxy-1,2,4-Triazine $N_1$-Oxide

To 3-Oxo-1,2,4-triazine $N_1$-oxide (0.904 g., 8 mmol) that has been dried in vacuo over $P_2O_5$ for 12 hours, was added hexamethyldisilazine (3.5 ml.) and a few mg. of $(NH_4)_2SO_4$. The mixture was heated with rigorous exclusion of moisture at 120° for 6 hours. Excess hexamethyldisilazine was removed by vacuum distillation (0.4 Hg mm.) at 50°. The residual low melting solid was used in the next step without further purification.

EXAMPLE VII

Anomeric $N_4$-(3,5-Di-O-p-Chlorobenzoyl-2-Deoxy-D-Ribofuranosyl)-3-Oxo-1,2,4-Triazine $N_1$-oxide To the silyl compound of Example VI was added 3.655 g., 8.5 mmol of 3,5-di-O-p-chlorobenzoyl-2-deoxy-D-ribofuranosyl chloride [prepared according to the procedure of M. P. Kotick et al., J. Org. Chem., 34, 3806 (1969)], and the mixture was heated in an oil bath of 115° in vacuo (20–25 Hg mm.) for 25 min. After cooling, the substance was dissolved in hot $CHCl_3$-EtOAc (900 ml., 1:1) and insolubles were removed by filtration. The solvent was evaporated and the residue was applied to a dry column of silica gel. The column was eluted with $CHCl_3$:EtOAc (9:1). Fractions containing the anomeric nucleosides rf ≈0.2 on silica plates $CHCl_3$-EtOAc 9:1) were combined and evaporated to dryness to give a white powder (1.080 g., 26.7%). This was dissolved in hot $CHCl_3$ (70 ml.), and after standing at −25° for 24 hr. the deposited crystals were collected (0.040 g., m.p. 192–196°). Two recrystallizations from $CHCl_3$ furnished the pure $\alpha$ anomer, m.p. 214–5°, $[\alpha]_d$ 72.48° (C. 0.436, DMSO). In the NMR, the anomeric proton appeared as a pseudo quartet centered at $\delta$ 6.18 p.p.m.

The original $CHCl_3$ mother liquor was evaporated to dryness and the residue was crystallized from EtOH to give the $\beta$-anomer (0.803 g., m.p. 188–9°). Two recrystallizations from EtOH yielded anomerically pure $\beta$-nucleoside, m.p. 189–91°, $[\alpha]_d$ −165.5° (C. 0.495 DMSO). In the NMR, the anomeric proton appeared as a pseudo doublet, centered at $\delta$ 6.25 p.p.m.

Anal.—Calcd. for $C_{22}H_{17}Cl_2N_3O_7$: C, 52.18; H, 3.38; N, 8.29. Found for $\alpha$ anomer: C, 52.12; H, 3.40; N. 8.26. Found for $\beta$ anomer: C, 52.30; H, 3.59; N, 8.25.

EXAMPLE VIII $N_4$-($\beta$-2-Deoxy-D-Ribofuranosyl)-3-Oxo-1,2-Triazine $N_1$-Oxide To a solution of $N_4$-(3,5,-di-O-p-chlorobenzoyl-2-deoxy-$\beta$-D-ribofuranosyl)-3-oxo-1,2,4-triazine $N_1$-oxide, (0.506 g., 1 mmol) (the levoratatory isomer) in 50 ml. of MeOH was added $CH_3ONa$ (3 mg.) and the suspension was stirred for 24 hours by which time a clear solution was obtained. Dowex 50 WX8 ion exchange resin, H⊕ form (2 ml. wet volume in MeOH), was added, and after 5 minutes stirring, the ion exchange resin was removed by filtration. The MeOH solution was concentrated to dryness and the syrupy residue was washed several times with Et$_2$O; the Et$_2$O was removed each time by decantation. The residue was applied to a dry column of silica gel, and the column was eluted with the upper phase of EtOAc, n-PrOH, H$_2$O (7:1:2). The band corresponding to a substance travelling with an ≈rf of 0.55 (silica plates, same solvent system as above) was collected, filtered from silica-gel, and evaporated to dryness. The residue was dissolved in H$_2$O and freeze dried to give a hygroscopic powder, 0.120 g., 52%. In the NMR (DMSO), the anomeric proton absorbs as a multiplet approximating the shape of a pseudo doublet at δ 6.03 p.p.m.

UV spectra: $\lambda_{max}^{pH 1}$ 209, 267 and 342 mu (ε=14,300, 7000 6490). $\lambda_{max}^{pH 7}$ 208; 264, and 342 mu (ε=14,200, 7210 6800). $\lambda_{max}^{pH 11}$ 233, 273 and 340 mu (ε=7160, 5590, 1960)

Anal.—Calcd. for C$_8$H$_{11}$N$_3$O$_5$: C, 41.92; H, 4.83; N, 18.33. Found: C, 41.88; H, 4.87; N, 17.01.

The compounds of this invention were tested to determine their efficacy as antitumor and antibacterial agents. In the antitumor tests, the method of Sidwell and Hoffman, Appl. Microbiol, 22, 797 (1971) was used to determine relative cytotoxicity against cancer (KB, Hela and Hep-2) and non-cancer (RK-13 rabbit kidney) cells. Toxicity was determined by microscopic (200 to 400×) examination. Floating cells or cells with abnormal shapes or ragged edges were indicative of damaged or killed cells resulting from toxicity of the compounds.

TABLE I.—Maximum tolerated dose (μg./ml.)

| Compound | KB cells | Hep-2 cells | Hela cells | RK-13 cells |
|---|---|---|---|---|
| $N^4$-(β-D-ribofuranosyl)-3-oxo-1,2,4-triazine $N_1$-oxide | | 0.32 | 3.2 | 10 |
| $N^4$-(2-deoxy-β-D-ribofuranoxyl-3-oxo-1,2,4-triazine $N_1$-oxide | [1] 1000 | | | |

[1] Slight toxicity evidenced at a concentration of 32 μg./ml.

It is to be observed from the foregoing data that $N_4$-(β-D-ribofuranosyl)-3-oxo-1,2,4-triazine $N_1$-oxide evidenced significantly lower toxicity against normal cells than against the cancel cells. This compound was also tested, as per the following protocol, to determine its antimicrobial activity against the bacterial strains shown in Table II.

A known amount of the compound was solubilized, and serially diluted (two-fold dilutions) in a nutrient broth suitable to the organism being tested. A known number of organisms was then added, mixed and incubated at a constant temperature with continuous shaking. Determinations were performed in duplicate.

The MIC (minimum inhibitory concentration) is the lowest concentration of compound preventing visible growth in the above tubes. The MLC (minimum lethal concentration) is the lowest concentration of compound rendering the organisms nonviable. It is determined by subinoculation of the MIC tubes without visible growth to fresh medium; growth in the fresh medium indicates viability. The MIC and MLC are determined after times of incubation consistent with the rate of growth of the bacteria tested.

TABLE II

Total Inhibition of Bacteria

| Organism: | MIC (μg./ml.) |
|---|---|
| Paeruginosa | 75 |
| S. aureus | 150 |
| E. coli | 150 |
| B-Hemolytic Strep. | 150 |

$N_4$-(2-deoxy-β-D-ribofuranosyl)-3-oxo-1,2,4-triazine $N_1$-oxide was also tested according to the same protocol against E. coli. Complete inhibition was obtained at a concentration of 6.56×10$^{-4}$ M.

At this point, it should be noted that 3-oxo-1,2,4-triazine $N_1$-oxide was also tested to determine antibacterial and antitumor efficacy and was found to be devoid of significant inhibitory activity, which is in sharp contrast with the report of Bobeck and Block, J. Med. Chem., 15, 164 (1972) that emimycin and its riboside were observed to possess approximately equal activity in various assays. While the explanation for this is not clearly understood, it may be that the 3-oxo-1,2,4-triazine nucleosides of this invention possess cytotoxic capability per se or are metabolized to a nucleotide by a relatively unspecified kinase present in the cell, while the parent heterocycle 3-oxo-1,2,4-triazine $N_1$-oxide fails to undergo such activation.

$N_4$-(β-D-ribofuranosyl) - 3 - oxo - 1,2,4 - triazine was tested to determine its antiviral activity using the virus-induced cytopathogenic effect (CPE) method of Sidwell et al., Applied Microbiology, 22:797, 1971. Briefly, the CPE procedure includes the dissolution of the anti-viral agent in a cell culture medium consisting of vitamins, amino acids, serium, buffer, penicillin, streptomycin and indicator dye in water. The virus suspended in the cell culture medium was added to an established monolayer of KB cells, and an equal volume of the anti-viral agent was then added within 15 minutes. The infected cells were incubated three days, and the degree of CPE on the cells was graded following microscopic examination. Controls for each experiment include cell controls (cells and cell culture medium only), virus controls (cells and virus and cell culture medium), and toxicity controls (cells and chemical and cell culture medium).

The virus rating (VR) of Sidwell et al. described in Applied Microbiology, supra, was used to evaluate the degree of significance of CPE inhibition. A virus rating (VR) greater than 0.5 is indicative of significant antiviral activity and a VR of less than 0.5 suggests slight anti-viral activity. When tested for efficacy against Rhino type 1A virus, a VR of .5 was obtained.

It is also to be noted that O-acylated derivatives of the 3-oxo-1,2,4-triazine $N_1$-oxide nucleosides are also within the scope of the present invention. Such derivatives include generally C$_1$ to C$_{18}$ acyl derivatives such as benzoyl, chlorobenzoyl, etc., which may be obtained by reaction of the free nucleoside or salts thereof with corresponding acid anhydrides or acyl halides in base.

We claim:

1. A compound of the structure:

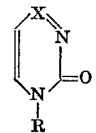

wherein X is N or N-oxide and R is H, β-D-ribofuranosyl or β-2-deoxy-D-ribofuranosyl; provided that when X is N, R is β-D-ribofuranosyl.

2. The compound of claim 1 in which X is N-oxide and R is H.

3. The compound of claim 1 in which X is N-oxide and R is β-D-ribofuranosyl.

4. The compound of claim 1 in which X is N-oxide and R is β-2-deoxy-D-ribofuranosyl.

5. $N_4$-(β-D-ribofuranosyl)-3-oxo-1,2,4-triazine $N_1$-oxide and benzoyl and chlorobenzoyl O-acylated derivatives thereof.

6. Anomeric-$N_4$-(2-deoxy - D - ribofuranosyl)-3-oxo-1,2,4-trazine $N_1$-oxides and benzoyl and chlorobenzoyl O-acylated derivatives thereof.

7. $N_4$-(β-ribofuranosyl)-3-oxo-1,2,4-triazine and benzoyl and chlorobenzoyl-O-acylated derivatives thereof.

8. Anomeric-$N_4$-(3,5-di-$O$-p-chlorobenzoyl - 2 - deoxy-$D$-ribofuranosyl)-3-oxo-1,2,4-triazine $N_1$-oxides.

9. $N_4$-(2,3,5-tri-$O$-benzoyl-$\beta$-$D$-ribofuranosyl)-3-oxo-1,2,4-triazine $N_1$-oxide.

References Cited
UNITED STATES PATENTS 3,352,849  11/1967  Shen et al. _____ 260—211.5 R
3,357,976  12/1967  Restivo _____ 260—211.5 R
3,697,518  10/1972  Schmidt et al. ____ 260—211.5 R JOHNNIE R. BROWN, Primary Examiner U.S. Cl. X.R.

260—248 AS